March 23, 1937. P. PIRSCH 2,074,558
TILLERMAN'S SEAT FOR LADDER TRUCK TRAILERS
Filed June 10, 1936
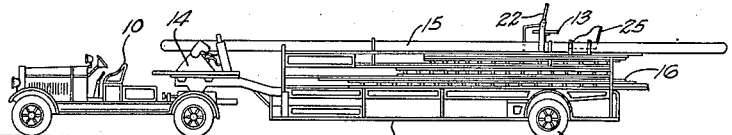
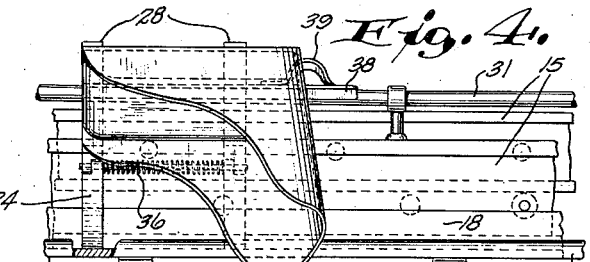
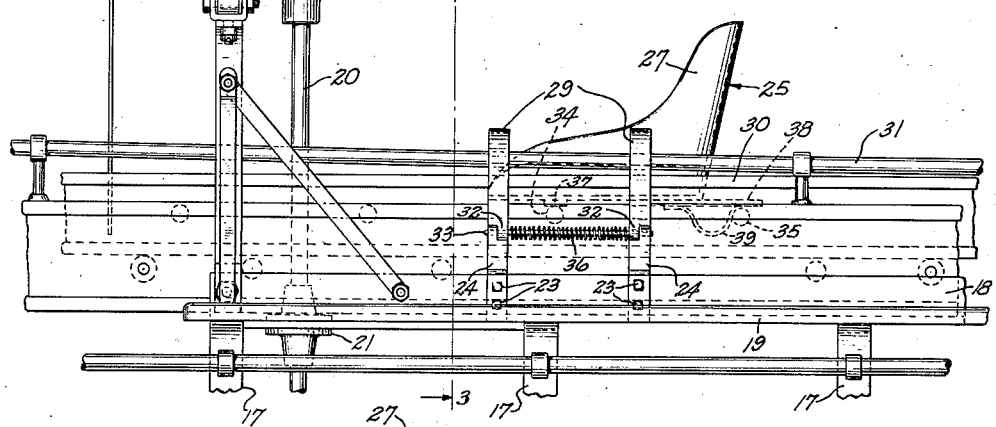
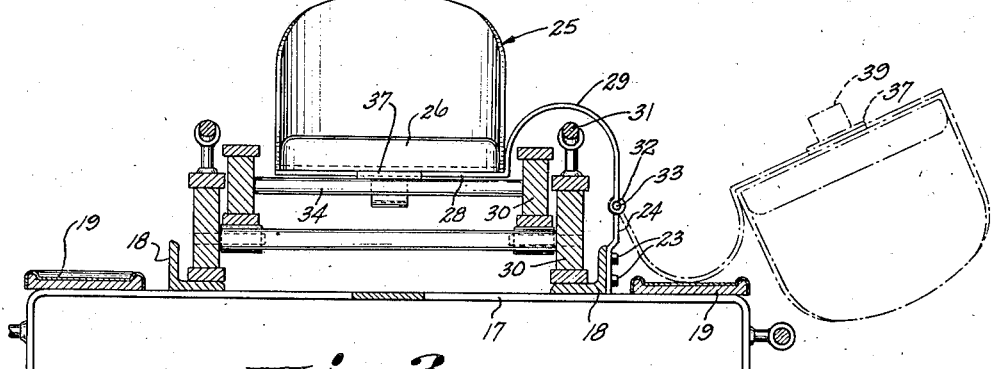
INVENTOR.
Peter Pirsch
BY
ATTORNEYS.

Patented Mar. 23, 1937

2,074,558

UNITED STATES PATENT OFFICE 2,074,558

TILLERMAN'S SEAT FOR LADDER TRUCK TRAILERS

Peter Pirsch, Kenosha, Wis., assignor to Peter Pirsch and Sons Co., Kenosha, Wis., a firm composed of Peter Pirsch, W. R. Pirsch, and Ceila Pirsch Even Application June 10, 1936, Serial No. 84,431

7 Claims. (Cl. 280—4)

This invention relates to improvements in tillerman's seats for ladder truck trailers.

Large sized aerial ladder trucks are usually provided with relatively long trailers mounted on wheels, which latter must be steered when the truck is turning a corner or turning into a narrow alley. The man whose duty it is to control the trailer wheels is usually termed a tillerman. Heretofore, the tillerman's seat and windshield have been mounted on vertical posts so as to be swingable from a driving position over the ladders to a lateral position clear of the ladders where they will not interfere with the manipulation thereof. With the type of swingable mounting heretofore employed, both the seat and windshield have been perched at a precarious height, and this height remained the same regardless of whether these fixtures were over the ladders or swung laterally. Due to present-day speeds, many tillermen have been dislodged from their seats and killed or injured. This usually occurs when one of the trailer wheels hits a curb or rut, or when a tire blows out. The high position is also hazardous because of the fact that in passing through low doorways, under low bridges, or under projecting limbs of trees there is danger of the tillerman being knocked off, or of the windshield being struck or broken with resulting injury to the tillerman.

Heretofore, when the truck arrived at a fire, the tillerman merely swung his windshield and seat laterally on the vertical support so that the aerial ladder could be elevated and the other ladders withdrawn from the truck. Because of the high position in which the windshield and seat were left, they were very much in the way, and the windshield was frequently broken in removing the ladders or was struck during the rotating of the rotary ladder on its turn-table.

The present invention relates more particularly to the seat and it is a principal object to provide a novel support and mounting which is arranged to maintain the seat in the lowest possible operative position on the rungs of the aerial ladder, and which is also arranged to provide for swinging of said seat to a lateral inverted position wherein it is still lower and entirely out of interfering position with respect to the ladders.

A more specific object of the invention is to provide in combination with a fire truck trailer having ladders carried longitudinally thereof, a tillerman's seat, and U-shaped supporting means projecting laterally of said seat and spanning the side rails of the uppermost ladder, said supporting means being hingedly connected to the trailer frame whereby the seat may be swung laterally from a position in which it rests upon the rungs of the top ladder to an inverted out-of-the-way position.

A further object of the invention is to provide in a tillerman's seat as above described, means on the bottom of said seat cooperable with the ladder rungs for guiding the seat to effective position and for properly supporting the seat against movement when in said position.

With the above and other objects in view, the invention consists of the improved tillerman's seat for ladder truck trailers and all its parts and combinations as set forth in the claims and all equivalents thereof.

In the accompanying drawing illustrating one complete embodiment of the preferred form of the invention in which the same reference numerals designate the same parts in all of the views:

Fig. 1 is a side elevational view of an aerial ladder truck showing the improved tillerman's seat in driving position;

Fig. 2 is a side elevational view on an enlarged scale showing a fragment of the trailer with the tillerman's seat and windshield in operative position;

Fig. 3 is a sectional view taken on line 3—3 of Fig. 2, the dot-and-dash lines showing how the seat may be swung laterally to an inverted out-of-the-way position; and Fig. 4 is a side elevational view showing a fragment of the trailer with the seat swung to inverted inoperative position.

Referring more particularly to the drawing, the numeral 10 designates the usual truck having a trailer 11 in connection therewith, said trailer having wheels 12 adapted to be steered in the usual manner by a removably mounted steering wheel 13. The ladder truck may be provided with the usual turn table 14 and associated mechanism for swinging and elevating an aerial ladder 15. Other ladders 16 may be removably mounted on the trailer beneath the aerial ladder.

Suitable U-shaped metal straps 17 forming a portion of the frame work of the trailer form a support for longitudinally extending angle bars 18, which angle bars are spaced apart in the manner shown in Fig. 3 to form a guide and support for the aerial ladder 15.

Also carried by said metal straps, on each side of the aerial ladder, are cat walks 19. The steering wheel 13 is adapted to have its shaft 20 removably insertable in a connection member 21 in the usual manner to effect a steering connection with the rear wheels 12.

A windshield 22 is suitably supported transversely of and above the aerial ladders to provide for swinging movement of said windshield to an inverted out-of-the-way position. The windshield assemblage forms subject matter of a companion application and will not be described in detail herein.

Suitably secured to the angle bar 18, on one side of the aerial ladder, as at 23 are spaced hinge members 24 preferably of metal, the said hinge members projecting upwardly above the angle bars 18 in the manner clearly shown in Fig. 3. The seat member 25, which preferably comprises a cushioned seat portion 26 and a rounded back member 27, has metal straps 28 secured transversely to the bottom thereof. The said straps project from one side of the seat and then extend upwardly and downwardly in substantially U-shaped form as at 29 to span the side beams 30 of the ladder and the truss rod 31 carried by one of said side beams. The downwardly projecting ends of the U-shaped parts 29 are in the form of hinge members as at 32 for cooperation with the hinge members 24, and a pintle 33 serves to complete the hinge structure.

As a result of this arrangement the seat may be supported directly on the rungs 34 and 35 of the uppermost aerial ladder part, this being the lowest position possible for the seat. By referring to Figure 3 it is also apparent that the seat may be quickly swung from driving position to an inverted lateral position as indicated by the dot-and-dash lines in Figure 3 and as indicated by Figure 4. When so swung the U-shaped supporting parts 29 become inverted in position and ultimately engage the cat walk 19 to maintain the seat in its swung position. If desired suitable coil spring means or the like 36 may be employed around the pintle 33 to aid in swinging the seat from operative to inoperative position. In other words the spring is so connected that when the seat is in operative position the spring is under tension.

The bottom of the seat may have a resilient pad 37 of rubber or the like which is engageable with the ladder rung 34 when the seat is in operative position. The bottom of the seat is also preferably provided with a longitudinally extending metal strip 38 which projects rearwardly of the seat, as shown in Fig. 4, and it has a resilient loop 39 of metal or the like depending therefrom. When the seat is in operative position one side of this loop wedges resiliently against the ladder rung 35 to maintain the seat in a rigid driving position (see Fig. 2).

Heretofore tillermen's seats have been mounted on vertical supporting posts and swingable in a horizontal plane thereon. As a result the seat had to be maintained at an elevation above the truss rods 31. Thus the seat was in a dangerously high position. Furthermore when swung to a lateral position it was maintained at this same precarious height and frequently interfered with the manipulation of the aerial ladder and with the removal of the ground ladders. With the present construction, due to the novel U-shaped supporting means which is adapted to span the side beams of the ladders and the truss rod carried by one of said beams, the seat can be supported in its lowest driving position directly on the rungs of the uppermost ladder. Also due to this novel supporting structure the seat can be swung to an inverted out-of-the-way position which is still lower than its driving position, and when in this latter position the seat is entirely clear of the aerial ladder and cannot possibly be struck during the swinging movement of the aerial ladder. It is further to be pointed out that when the seat is in its inverted position, the seat cushion is protected from getting wet or from becoming covered with ice which is likely to form in the winter time from water spray. With the old style seat construction wherein the seat was merely swingable on a vertical post, the seat cushion soon became wet or covered with ice.

Although only one form of the invention has been shown and described, it is obvious that various changes and modifications can be made without departing from the spirit of the invention, and all of such changes are contemplated as may come within the scope of the claims.

What I claim is:

1. In a fire vehicle having ladders extending longitudinally thereof, a tillerman's seat, U-shaped supporting means extending laterally from said seat and forming an arch spanning the side beams of the uppermost ladders when the seat is in driving position, and means for hingedly connecting said U-shaped supporting means to the vehicle at one side of said ladders to provide for swinging movement of the seat from a driving position to inverted position at one side of said ladders.

2. In a fire vehicle having ladders extending longitudinally thereof in a horizontal position, a tillerman's seat normally positionable on the rungs of the uppermost ladder, U-shaped supporting means extending laterally from said seat and forming an arch spanning the side beam of said uppermost ladder when the seat is in normal position, and means for hingedly connecting said U-shaped supporting means to the vehicle at one side of the ladders to provide for swinging movement of the seat from said normal position to an inverted position at one side of said ladders.

3. In a fire vehicle having ladders extending longitudinally thereof in a horizontal position, a tillerman's seat normally positionable on the rungs of the uppermost ladder, U-shaped supporting means extending laterally from said seat and forming an arch spanning the side beam of said uppermost ladder when the seat is in normal position, means for hingedly connecting said U-shaped supporting means to the vehicle at one side of the ladders to provide for swinging movement of the seat from said normal position to an inverted position at one side of said ladders, and means on the bottom of said seat engageable with one of the ladder rungs for bracing said seat in driving position.

4. In a fire vehicle having ladders extending longitudinally thereof in a horizontal position and having a cat walk at one side of said ladders, a tillerman's seat normally positionable on the rungs of the uppermost ladder, U-shaped supporting means extending laterally from said seat and forming an arch spanning the side beam of said uppermost ladder when the seat is in normal position, and means for hingedly connecting said U-shaped supporting means to the vehicle at one side of the ladders to provide for swinging movement of the seat from said normal position to an inverted position at one side of said ladders, said hinge connection being so positioned that the U-shaped supporting means engages the vehicle cat walk when the seat is inverted.

5. In a fire vehicle having ladders extending longitudinally thereof, a tillerman's seat, U-shaped supporting means extending laterally from said seat and forming an arch spanning the side beams of the uppermost ladders when the seat is in driving position, and means for hingedly connecting said U-shaped supporting means to the vehicle at one side of said ladders to provide for swinging movement of the seat from a driving position to a position at one side of said ladders.

6. In a fire vehicle having ladders extending longitudinally thereof in a horizontal position, a tillerman's seat normally positionable on the rungs of the uppermost ladder, U-shaped supporting means extending laterally from said seat and forming an arch spanning the side beam of said uppermost ladder when the seat is in normal position and means for hingedly connecting said U-shaped supporting means to the vehicle at one side of the ladders to provide for swinging movement of the seat from said normal position to a position at one side of said ladders.

7. In a fire vehicle having ladders extending longitudinally thereof in a horizontal position, a tillerman's seat normally positionable on the rungs of the uppermost ladder, U-shaped supporting means extending laterally from said seat and forming an arch spanning the side beam of said uppermost ladder when the seat is in normal position, means for hingedly connecting said U-shaped supporting means to the vehicle at one side of the ladders to provide for swinging movement of the seat from said normal position to a position at one side of said ladders, and means on the bottom of said seat engageable with one of the ladder rungs for bracing said seat in driving position.

PETER PIRSCH.